US012594836B2

(12) United States Patent
Ostgathe et al.

(10) Patent No.: US 12,594,836 B2
(45) Date of Patent: Apr. 7, 2026

(54) METHOD FOR OPERATING A BRAKE SYSTEM OF A VEHICLE

(71) Applicant: Bayerische Motoren Werke Aktiengesellschaft, Munich (DE)

(72) Inventors: Nils Ostgathe, Munich (DE); Johannes Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 752 days.

(21) Appl. No.: 17/917,701

(22) PCT Filed: Mar. 11, 2021

(86) PCT No.: PCT/EP2021/056139
§ 371 (c)(1),
(2) Date: Oct. 7, 2022

(87) PCT Pub. No.: WO2021/204489
PCT Pub. Date: Oct. 14, 2021

(65) Prior Publication Data
US 2023/0150370 A1 May 18, 2023

(30) Foreign Application Priority Data
Apr. 9, 2020 (DE) ..................... 10 2020 110 013.2

(51) Int. Cl.
*B60T 13/58* (2006.01)
*B60L 7/08* (2006.01)
(Continued)

(52) U.S. Cl.
CPC *B60L 7/18* (2013.01); *B60L 7/08* (2013.01); *B60L 7/20* (2013.01); *B60L 7/24* (2013.01)

(58) Field of Classification Search
CPC ...... B60L 7/18; B60L 7/08; B60L 7/20; B60L 7/24; B60T 2270/60; B60T 13/586
See application file for complete search history.

(56) References Cited

U.S. PATENT DOCUMENTS 6,986,335 B2 * 1/2006 Sieber ............. B60W 30/18136
123/320
9,124,201 B2 9/2015 Schmidt et al.
(Continued)

FOREIGN PATENT DOCUMENTS

DE 10 2012 202 647 A1 8/2013
DE 10 2017 006 692 A1 3/2018
WO WO 02/49868 A1 6/2002

OTHER PUBLICATIONS

PCT/EP2021/056139, International Search Report dated May 21, 2021 (Two (2) pages).
(Continued)

*Primary Examiner* — Thomas W Irvin
(74) *Attorney, Agent, or Firm* — Crowell & Moring LLP

(57) ABSTRACT
A method for operating a brake system of a vehicle, where the vehicle has an electric machine usable for a regenerative braking of the vehicle and a drive unit usable in an overrun operation for an overrun braking of the vehicle, includes detecting an initiation of deceleration of the vehicle and detecting a driving situation suitable for regeneration. The method further includes initiating the overrun operation of the drive unit and the overrun braking of the vehicle and activating the regenerative braking so as to achieve a set-point total regeneration torque. The regenerative braking is activated only after a limit value for a difference between an actual overrun regeneration torque by the overrun braking and a setpoint overrun regeneration torque is undershot.

14 Claims, 1 Drawing Sheet

(51) Int. Cl.
  *B60L 7/18* (2006.01)
  *B60L 7/20* (2006.01)
  *B60L 7/24* (2006.01)

(56) References Cited

U.S. PATENT DOCUMENTS

| | | | | |
|---|---|---|---|---|
| 9,242,565 | B2 * | 1/2016 | Kleickmann | B60L 50/52 |
| 9,381,897 | B2 * | 7/2016 | Schuler | B60L 7/18 |
| 11,254,216 | B2 * | 2/2022 | Fracchia | B60T 8/1761 |
| 11,260,845 | B2 * | 3/2022 | Lad | B60K 6/547 |
| 11,660,967 | B2 * | 5/2023 | Murawski | B60T 8/17 |
| | | | | 701/22 |
| 11,987,151 | B2 * | 5/2024 | Fracchia | B60L 15/2009 |
| 2004/0025835 | A1 * | 2/2004 | Sieber | B60W 10/18 |
| | | | | 180/65.285 |
| 2014/0046567 | A1 * | 2/2014 | Schuler | B60W 10/184 |
| | | | | 701/70 |
| 2014/0246281 | A1 * | 9/2014 | Kleickmann | B60L 50/52 |
| | | | | 188/159 |
| 2015/0251657 | A1 | 9/2015 | Johri et al. | |
| 2019/0054913 | A1 * | 2/2019 | Lad | B60W 20/00 |
| 2019/0263268 | A1 * | 8/2019 | Fracchia | B60T 13/586 |
| 2022/0009354 | A1 * | 1/2022 | Murawski | B60L 3/12 |
| 2022/0176825 | A1 * | 6/2022 | Fracchia | B60T 13/586 |

OTHER PUBLICATIONS

German Search Report issued in German application No. 10 2020 110 013.2 dated Feb. 10, 2021, with Statement of Relevancy (Seven (7) pages).

* cited by examiner

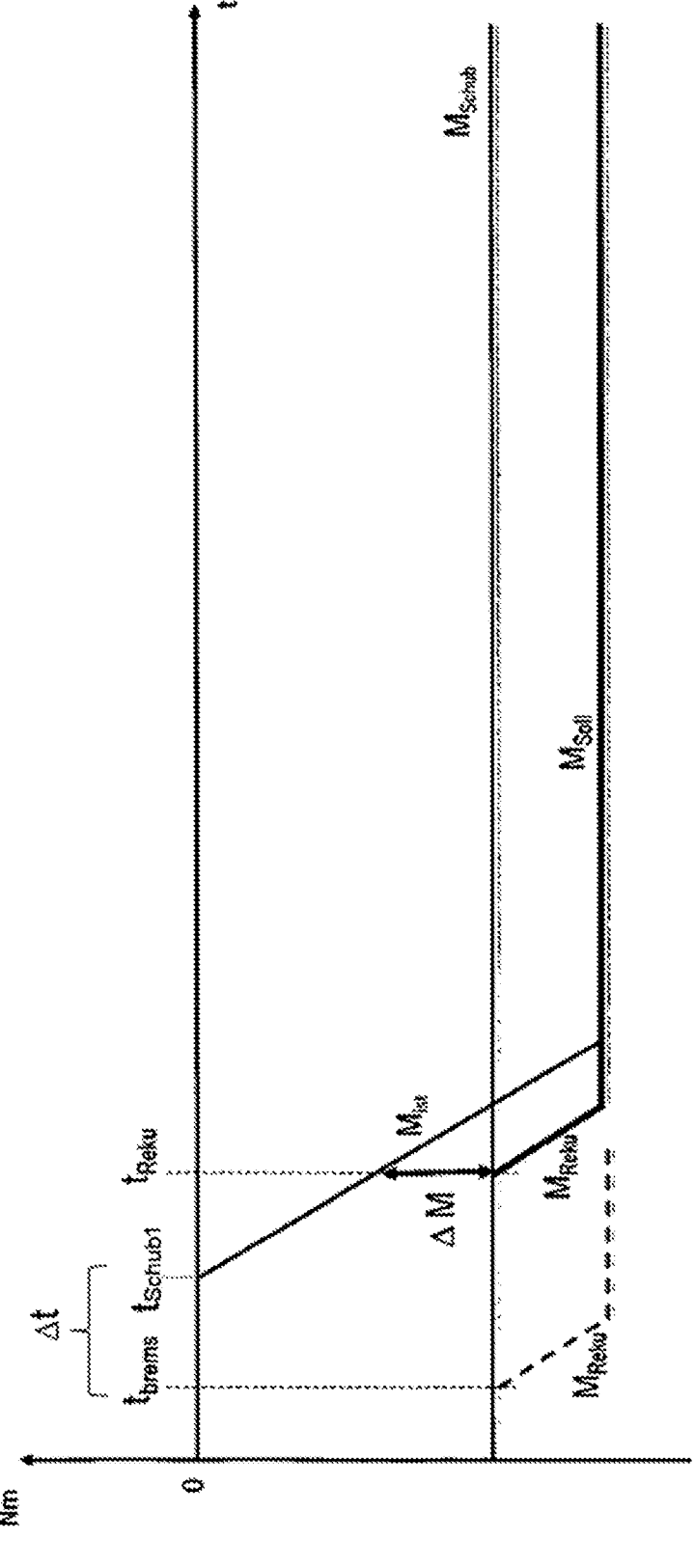

METHOD FOR OPERATING A BRAKE SYSTEM OF A VEHICLE

BACKGROUND AND SUMMARY OF THE INVENTION

The invention relates to a method for operating a brake system of a vehicle. For the prior art, reference is made, for example, to DE 10 2017 006 692 A1.

"Regeneration" is known, in particular, in electric vehicles and hybrid vehicles, that is to say vehicles with an electric drive unit (=electric motor). In regeneration, kinetic energy of the driven wheels is converted into electrical energy by the electric drive unit, in particular by the electric motor. In this case, the electric drive unit is operated as a generator. Some of the energy which is normally lost as frictional heat during braking can thus be fed in the form of electrical energy into an electrical energy storage device, such as, for example, into a battery or a capacitor, and can be used subsequently. At the same time, generator operation of the electric machine achieves an effect which brakes the vehicle, known as regenerative braking. This is also referred to as recuperative braking.

In order to achieve regenerative braking, a regeneration torque is set at the electric drive unit, which torque represents a braking torque and thus decelerates the vehicle.

Particularly in the case of electric vehicles, there is a known practice of using the regeneration by setting a regeneration torque (generally as a function of a brake pedal travel of the brake pedal as a result of actuation of the brake pedal by the vehicle occupant) when a braking request is detected, for example due to actuation of the brake pedal by a vehicle occupant, and thus braking the vehicle specifically to the desired braking power.

It is furthermore known that the regeneration can also be used in the overrun mode or drag mode of a drive unit to decelerate the vehicle. In this case, as a rule, what is referred to as an overrun regeneration torque (also known as drag regeneration torque) is set at the drive unit if the actuation of the accelerator pedal by a vehicle occupant is ended or diminishes, that is to say, for example, if the vehicle occupant reduces the actuation of the accelerator pedal or takes their foot off the accelerator pedal completely. The vehicle is thereby braked. Usually, the overrun braking torque reaches its maximum value (referred to as the setpoint overrun regeneration torque) when the vehicle occupant ends the actuation of the accelerator pedal.

In order to initiate a braking operation which is as efficient as possible, it is known from the prior art to set or apply the regeneration torque immediately after detection of a deceleration request. DE 10 2017 006 692 A1, for example, discloses a method which aims specifically to avoid delayed activation of the regeneration process by rapid setting of a regeneration torque. In this case, the regenerative braking is performed simultaneously in addition to the overrun regeneration (by reducing or ending the actuation of the accelerator pedal).

This rapid setting or superimposition of the regeneration torque directly after the detection of a deceleration request causes unsteady braking behavior in some situations, which a vehicle driver or a vehicle occupant perceives as uncomfortable. This unsteady braking behavior is due to "lag" of the drive, which still requires a certain period of time at the start of the overrun mode to implement the overrun torque. This time lag is perceived as unsteady by a vehicle driver. The braking behavior of the vehicle is then somewhat offset in time from the actuation of the brake pedal and thus different from the effect intended by a vehicle driver. Moreover, such braking behavior can lead to possible overbraking since, until the overrun torque is implemented or until the setting of an overrun torque starts, the vehicle driver assumes that the vehicle is not responding adequately to its actuation and then initiates a strong braking actuation (also referred to as two-phase braking).

It is thus the object of the invention to provide a method for operating a brake system of a vehicle in order to make the deceleration behavior of the vehicle with regenerative braking more predictable and thus to improve the driving behavior of the vehicle.

In order to achieve the object, a method is provided for operating a brake system of a vehicle, wherein the vehicle comprises at least one electric machine able to be used for regenerative braking of the vehicle.

The vehicle is preferably a motor vehicle, in particular a two-track motor vehicle. However, the invention is also possible on a single-track vehicle, such as, for example, a motorcycle or the like.

Furthermore, the electric machine is preferably an electric motor for driving at least one axle or one wheel of the vehicle.

For the purposes of this invention, the regenerative braking is understood to mean the initiation of braking, already described above, by applying a regeneration torque of the electric machine. Here, the magnitude of the regeneration torque applied and thus the magnitude of the deceleration of the vehicle as a result of the regenerative braking is preferably dependent on the brake pedal travel effected by the driver.

Furthermore, it is envisaged that the vehicle comprises a drive unit which can be used for overrun braking in the overrun mode.

This drive unit is preferably formed by the already mentioned electric machine. Alternatively or additionally, the drive unit can also be formed by an internal combustion engine. In any case, it must be a drive unit which can be operated in an overrun mode and which can carry out overrun braking (also referred to as drag regeneration or overrun regeneration) in this overrun mode. In this case, the drive unit must be able to implement a specified setpoint drag regeneration or a specified setpoint overrun braking torque.

To implement overrun regeneration, what is referred to as an overrun regeneration torque (also known as a drag regeneration torque) is set at the drive unit. The vehicle is thereby braked. When the actuation of the accelerator pedal is ended, the overrun braking torque usually reaches its maximum value, the abovementioned setpoint overrun regeneration or setpoint drag regeneration, after a certain period of time. When this maximum value is reached depends very much on the corresponding application in the drive. In a pure electric vehicle, for example, this period of time is generally somewhat shorter than in a vehicle that has a hybrid drive, owing to the internal combustion engine.

In this case, the overrun mode of the drive unit starts, in particular, when the vehicle driver releases the accelerator pedal or reduces the driving actuation or ends it completely. Thus, if the vehicle driver actuates the accelerator pedal or gas pedal less or if the vehicle driver ends the pedal actuation of the accelerator pedal or gas pedal, for example, then the drive unit is put into an overrun mode and overrun braking or "drag regeneration" begins; the vehicle is thereby decelerated. However, a certain period of time passes before the drag torque or overrun torque is implemented at the drive unit, i.e., the overrun regeneration or drag regeneration occurs with a delay of a few milliseconds to several seconds.

In a first step of the method, it is accordingly envisaged that initiation of deceleration of the vehicle is detected, for example by means of a control unit or certain sensors.

Such initiation of deceleration can be actuation of the brake pedal by a vehicle driver, for example. Alternatively or simultaneously, such initiation of deceleration can be automatic or independent braking of the vehicle, for example when the vehicle is in an autonomous driving mode or braking mode (such as, for example, when automatic headway control is activated).

At the same time, a driving situation suitable for regeneration is detected. This detection is likewise carried out by suitable sensors or by means of stored presets of a control unit.

For the purposes of this invention, a driving situation suitable for regeneration refers to driving states in which an abovementioned braking regeneration or regenerative braking takes place, that is to say in which the electric machine is acted upon by a regeneration torque and the vehicle is thereby decelerated.

Such a situation suitable for regeneration is present, for example, in the event of a load change. If the electric machine, in particular the electric motor as a drive unit, is at a positive torque (that is to say a drive torque) and if the driver then releases the accelerator pedal and immediately thereafter wishes to actively brake the vehicle by actuating the brake pedal, a rapid load change takes place.

Further examples of a driving situation suitable for regeneration are active initiation of braking by a vehicle driver by actuation of the brake pedal, interruption of ACC or cruise control by actuation of the brake pedal or what is referred to as two-footed driving. In the case of the two-footed driving, the accelerator pedal is simultaneously actuated as well as the brake pedal. A further driving situation suitable for regeneration is, for example, the ending of engine coasting, that is to say that a vehicle coasting with the internal combustion engine switched off is braked by the actuation of the brake pedal.

Subsequently, it is envisaged that the drive unit, preferably the electric machine itself, is put into an overrun mode, i.e., an overrun regeneration torque or drag regeneration torque which decelerates the vehicle is set at the drive unit. The drive unit requires a certain time to implement the setpoint drag regeneration or setpoint overrun regeneration, i.e., to implement the maximum drag regeneration torque or overrun regeneration torque.

The drive unit also requires a short period of time to initiate the overrun mode, i.e., a time delay occurs between the driver releasing or easing off the accelerator pedal or between the initiation command for drag regeneration from a control unit and the actual implementation of drag regeneration.

The current actual drive torque is then adjusted down to the maximum or desired setpoint drag regeneration torque within a certain period of time.

Subsequent to the initiation of the overrun mode of the drive unit, the activation or initiation of the regenerative braking is envisaged; that is to say a regeneration torque is set at the electric machine, preferably at the electric motor mentioned as the drive unit, and the vehicle thereby undergoes a further deceleration. In this case, it is envisaged that a setpoint total regeneration, that is to say a setpoint total regeneration torque, should be achieved by the regenerative braking and the overrun braking. This setpoint total regeneration torque represents the desired braking torque to be finally set. Here, the setpoint total regeneration torque is achieved by superimposing the overrun regeneration torque and the braking regeneration torque.

According to the invention, provision is made for the regenerative braking mentioned to take place by setting a regeneration torque at the electric machine only after the difference between the actual drive torque or the current actual overrun regeneration torque and the setpoint overrun regeneration torque has fallen below a specified limit value. In an overrun mode of the vehicle, the actual drive torque corresponds to an actual overrun regeneration torque. For the purposes of this invention, such a difference is referred to as an "activation offset". In this case, the activation of the regenerative braking, that is to say the setting of a regeneration torque, is, according to the invention, dependent on an absolute difference between the actual drive torque and the setpoint overrun regeneration torque.

That is to say that the regenerative braking is not activated until only a specific activation offset is still present between the actual drive torque of the drive unit and the setpoint overrun regeneration torque or setpoint drag regeneration torque. The difference between the actual drive torque and the setpoint drag regeneration torque which is described by this activation offset must therefore be below a specified threshold in order for the regenerative braking to be demanded or activated or initiated.

In an alternative embodiment of the invention, the regeneration torque is set at the electric machine to activate the regenerative braking only when the drive unit has fallen below a certain minimum actual drive torque in the overrun mode or has reached a specific actual overrun regeneration torque. In this case, the activation of the regenerative braking, that is to say the setting of a regeneration torque, is dependent, according to the invention, on a relative value of the actual drive torque with respect to the setpoint overrun regeneration torque.

This specific minimum actual drive torque, from which the regenerative braking is activated, can be 0-100% of the setpoint overrun regeneration torque, particularly preferably 60-80% of the setpoint overrun regeneration torque or setpoint drag regeneration torque. In principle, a value range of 0-100% is conceivable, where the relative value is oriented, in particular, with respect to the absolute level of the setpoint drag regeneration torque. This can vary greatly, both within a vehicle (owing to different driving modes) and between different vehicles (electric vehicle, hybrid vehicle, mild hybrid vehicle, etc.).

In the case of an electric motor as a drive unit and as an electric machine, for example, regenerative braking or a regeneration torque is not required by the latter until the electric motor itself has already very largely implemented its own setpoint overrun torque (preferably 60-80% of the setpoint overrun regeneration torque).

This method has the advantage, in particular, that the driving behavior and the braking behavior of the vehicle can be more easily evaluated by a vehicle occupant, and incorrect braking (such as overbraking or two-phase braking) can thereby be prevented. As a result of the method according to the invention, the deceleration behavior of the vehicle is felt to be smoother and thus more comfortable for a vehicle driver.

In addition to the method according to the invention, a brake system for carrying out the method and an electric vehicle and a hybrid vehicle comprising such a brake system are also provided.

The brake system according to the invention is a brake system suitable for balancing (also known as an integrated brake system). In contrast to a conventional brake system, such a brake system suitable for balancing is capable of balancing or blending back and forth between the friction brake and braking regeneration. It is particularly preferably a pedal-decoupled brake system (also referred to as "by-wire" brake actuation), in which balancing of the braking torque between regeneration and the friction brake is not noticeable in the brake pedal.

The brake system according to the invention comprises at least one electric machine, which is designed in such a way that it can carry out regenerative braking of the vehicle.

As already mentioned above, this electric machine is, in particular, an electric motor which serves as a drive unit for the vehicle.

Furthermore, the brake system comprises at least one drive unit, which is designed in such a way that it can carry out overrun braking of the vehicle in an overrun mode of the drive unit.

This drive unit can be the already mentioned electric machine, in particular the electric motor as a drive unit of the vehicle. Alternatively, as already provided above, it is likewise conceivable for the drive unit to be formed by an additional drive unit, such as, for example, an internal combustion engine, which decelerates or brakes the vehicle in an overrun mode by means of an overrun regeneration torque.

At least one control unit and/or at least one sensor unit are/is provided (for example a known braking control system which is already present in the vehicle, such as, for example, a DSC) which is configured in such a way as to detect initiation of deceleration of the vehicle and a driving situation which is suitable for regeneration.

Furthermore, the brake system according to the invention comprises at least one (additional or the already mentioned) control unit which is configured in such a way as to initiate regenerative braking of the vehicle or to set a regeneration torque at the electric machine, in particular at the electric motor. In this case, the control unit is designed in such a way that it activates the regenerative braking only after a specified actual drive torque has been reached or after a specified difference between the current actual drive torque of the drive unit and a setpoint overrun regeneration torque of the drive unit has been reached or undershot.

In a first provided embodiment, the brake system is arranged in an electric vehicle. The electric vehicle according to the invention comprises the brake system for carrying out the method according to the invention.

In this case, the electric machine is designed as an electromotive drive (also referred to as an electric motor) of the vehicle and is responsible for providing energy for driving the vehicle. Here, both the overrun braking mentioned and the regenerative braking are implemented by means of the electromotive drive. In order, therefore, to achieve a specified setpoint total regeneration torque or a specified total regeneration, the electromotive drive is first put into an overrun mode. After the specified difference between the actual drive torque and the setpoint overrun regeneration has been reached, the regenerative braking is initiated or activated by setting a regeneration torque at the electromotive drive. By means of the setpoint overrun regeneration and later the superimposed regenerative braking, the desired setpoint total regeneration or setpoint total regeneration torque is achieved and the vehicle is braked accordingly.

The electric machine is then designed in such a way that it can be operated both in an overrun mode (in which overrun braking takes place) and in a regeneration mode (in which regenerative braking of the vehicle takes place). Here, the regeneration mode and the overrun mode can take place simultaneously or in parallel.

In addition, a hybrid vehicle is also provided which comprises a mentioned brake system according to the invention for carrying out the method according to the invention.

This hybrid vehicle comprises at least one electric machine, in particular an electromotive drive, and a further drive unit. In this context, the vehicle can preferably be driven both by the electromotive drive and by the further drive unit.

It is also possible for the hybrid vehicle to be driven only by one of the two, in particular only by the electric machine. In the latter case, the additional drive unit can be used for charging an energy storage device, such as, for example, a capacitor or a battery, of the electric machine.

However, it is necessary for the electric machine or the additional drive unit to be designed in such a way that the vehicle can be put into a regeneration mode and into an overrun mode in order to achieve the setpoint total regeneration mentioned.

These and further features can be gathered not only from the claims and from the description but also from the drawing, it being possible for the individual features, in each case individually or jointly in the form of subcombinations, to be implemented in an embodiment of the invention, and to represent advantageous, independently protectable embodiments for which protection is claimed here.

In the following, the invention is explained further with reference to an exemplary embodiment.

BRIEF DESCRIPTION OF THE DRAWING

The single FIGURE shows a diagram of the progression of the current braking torque ($M_{ist}$) in Nm which acts on the vehicle during a method according to the invention as a function of time t.

DETAILED DESCRIPTION OF THE DRAWING

To carry out the method, the brake system of the exemplary embodiment comprises an electric motor for driving the vehicle, which can implement overrun braking of the vehicle in an overrun mode by means of an overrun torque, and can implement regenerative braking of the vehicle in the regeneration mode.

In an initial situation, the drive torque of the electric motor $M_{ist}$ is in a positive range (not shown in the diagram).

In a first step of the method, initiation of deceleration of the vehicle or a deceleration request is detected, for example by actuation of the brake pedal of the vehicle or by diminishing actuation or ending of actuation of an accelerator pedal. This deceleration request or this initiation of deceleration takes place at time $t_{brems}$. In a following step, a driving situation suitable for regeneration is detected, i.e., it is determined by suitable sensor technology or calculations in the vehicle that regenerative braking should take place.

Subsequent to the detection of the initiation of deceleration or the deceleration request by the vehicle driver, an overrun mode of the electric motor is initiated in that the actual drive torque $M_{ist}$ is brought to a setpoint overrun regeneration torque $M_{Schub}$. In many driving situations, however, there is a time delay $\Delta t$ between the time $t_{brems}$ at which initiation of deceleration or a deceleration request was detected and the actual initiation of the overrun mode, that is to say the time $t_{schub}$ at which a negative drive torque $M_{ist}$ is actually initiated by an overrun mode of the electric motor.

If regenerative braking or a regeneration torque $M_{Reku}$ is set directly after detection of the deceleration request or the initiation of deceleration at time $t_{brems}$, as indicated by the dashed line ($M_{Reku}$) in FIG. 1, then an unsteady braking behavior arises since regeneration braking has already begun, while overrun regeneration has not yet begun owing to the time delay $\Delta t$. This braking behavior is felt to be unsteady and uncomfortable by a vehicle driver or vehicle occupant.

In order to avoid this disadvantage, it is envisaged that the regeneration torque $M_{Reku}$ for activating the regenerative braking is set only after a specified difference $\Delta M$ between the actual drive torque or actual overrun regeneration torque $M_{ist}$ and the setpoint overrun regeneration torque $M_{Schub}$ has been reached. This difference is also referred to as an activation offset $\Delta M$.

For this purpose, a regeneration torque $M_{Reku}$ is superimposed or set at the electric motor at the time $t_{Reku}$ at which the activation offset was reached. By the setting of the regeneration torque $M_{Reku}$, the regenerative braking is activated.

The total regeneration torque or total braking torque $M_{soll}$ is then achieved by means of the set setpoint overrun regeneration torque $M_{Schub}$ and the set regeneration torque $M_{Reku}$.

In this way, steady braking behavior, which is perceived as comfortable by a vehicle occupant, is achieved.

The invention claimed is:

1. A method for operating a brake system of a vehicle, wherein the vehicle comprises an electric machine for a configured to implement regenerative braking of the vehicle and a drive unit configured to operate in an overrun mode to carry out an overrun braking of the vehicle, the method comprising the steps of:

in response to detecting that a deceleration of the vehicle is initiated and a driving situation is suitable for regeneration, placing the drive unit into the overrun mode so as to initiate the overrun braking; and subsequently activating the regenerative braking so as to achieve a setpoint total regeneration torque, wherein the regenerative braking is activated only after a limit value for a difference between an actual overrun regeneration torque by the overrun braking and a setpoint overrun regeneration torque is undershot.

2. The method according to claim 1, wherein the overrun braking is carried out by an internal combustion engine or by the electric machine.

3. The method according to claim 1, wherein the vehicle is driven by an internal combustion engine and by the electric machine.

4. The method according to claim 1, wherein the vehicle is driven by the electric machine and the overrun braking is carried out by the electric machine.

5. The method according to claim 1, wherein a load change or an active initiation of braking or a two-footed driving or an engine coasting is the driving situation suitable for regeneration.

6. A brake system for a vehicle configured to carry out the method according to claim 1, comprising:

an electric machine which is configured to carry out regenerative braking of the vehicle;

a drive unit configured to carry out overrun braking of the vehicle in the overrun mode of the drive unit;

a first control unit or a sensor unit which is configured to detect initiation of deceleration of the vehicle and a driving situation suitable for regeneration; and a second control unit which is configured to initiate regenerative braking of the vehicle.

7. A method for operating a brake system of a vehicle, wherein the vehicle comprises an electric machine configured to implement regenerative braking of the vehicle and a drive unit configured to operate in an overrun mode to carry out an overrun braking of the vehicle, the method comprising the steps of:

in response to detecting that a deceleration of the vehicle is initiated and a driving situation is suitable for regeneration, placing the drive unit into the overrun mode so as to initiate the overrun braking; and subsequently activating the regenerative braking so as to achieve a setpoint total regeneration torque, wherein the regenerative braking is activated only after an actual drive torque of the drive unit reaches 0-100% of a setpoint overrun regeneration torque.

8. The method according to claim 7, wherein the regenerative braking is activated as soon as the actual drive torque reaches 60-80% of the setpoint overrun regeneration torque.

9. The method according to claim 7, wherein the overrun braking is carried out by an internal combustion engine or by the electric machine.

10. The method according to claim 7, wherein the vehicle is driven by an internal combustion engine and by the electric machine.

11. The method according to claim 7, wherein the vehicle is driven by the electric machine and the overrun braking is carried out by the electric machine.

12. The method according to claim 7, wherein a load change or an active initiation of braking or a two-footed driving or an engine coasting is the driving situation suitable for regeneration.

13. An electric vehicle, comprising:

an electric machine, wherein the electric vehicle is drivable by the electric machine;

wherein the electric machine is configured such that overrun braking of the electric vehicle takes place in an overrun mode, regenerative braking of the electric vehicle takes place in a regeneration mode, and the regenerative braking is activated subsequent to an initiation of the overrun braking only after a limit value for a difference between an actual overrun regeneration torque by the overrun braking and a setpoint overrun regeneration torque is undershot.

14. A hybrid vehicle, comprising:

an electric machine; and an internal combustion engine, wherein the hybrid vehicle is drivable by the electric machine and the internal combustion engine, wherein regenerative braking can be carried out by the electric machine in a regeneration mode, wherein overrun braking can be carried out by the internal combustion engine and/or by the electric machine in an overrun mode, and wherein the regenerative braking is activated subsequent to an initiation of the overrun braking only after a limit value for a difference between an actual overrun regeneration torque by the overrun braking and a setpoint overrun regeneration torque is undershot.

* * * * *